United States Patent
Cutter, Jr. et al.

(10) Patent No.: US 7,441,121 B2
(45) Date of Patent: Oct. 21, 2008

(54) DEVICE CERTIFICATE SELF-INDIVIDUALIZATION

(75) Inventors: Benjamin Brooks Cutter, Jr., Kirkland, WA (US); Clifford Paul Strom, Sammamish, WA (US); Brian Patrick Evans, Redmond, WA (US); Amit Jain, Sammamish, WA (US); Michael Yui-Kwan Siu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 821 days.

(21) Appl. No.: 10/968,462

(22) Filed: Oct. 18, 2004

(65) Prior Publication Data

US 2006/0085646 A1 Apr. 20, 2006

(51) Int. Cl.
*H04L 9/00* (2006.01)

(52) U.S. Cl. .................................... 713/175; 713/173
(58) Field of Classification Search ................. 713/175, 713/173, 172; 726/10, 29; 380/282
See application file for complete search history.

(56) References Cited

U.S. PATENT DOCUMENTS

| 2004/0088548 A1* | 5/2004 | Smetters et al. ............. 713/175 |
| 2004/0193919 A1* | 9/2004 | Dabbish et al. ............. 713/201 |
| 2006/0020784 A1* | 1/2006 | Jonker et al. ................ 713/157 |

* cited by examiner

*Primary Examiner*—Ellen Tran

(57) ABSTRACT

Generating a device certificate. A method of generating a device certificate comprising forming a template that will generate a device certificate upon the occurrence of a triggering event, filling in an authorization root certificate section of the template; filling in an authorization certificate section of the template, filling in a group certificate section of the template, and forming a device certificate section of the template.

16 Claims, 8 Drawing Sheets

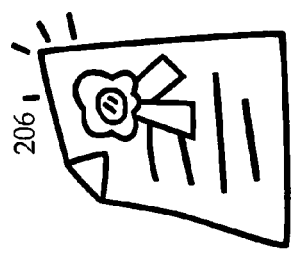
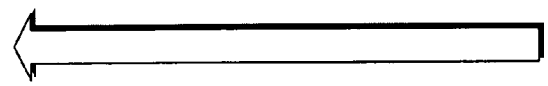
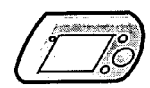
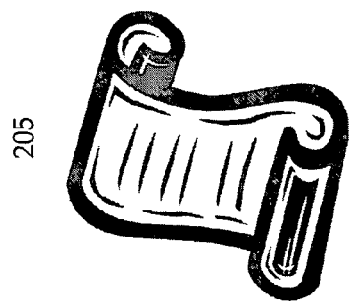
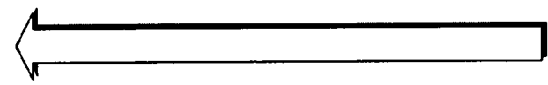
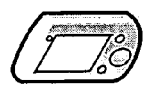
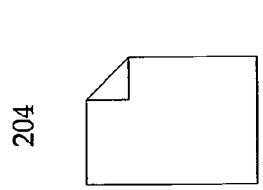
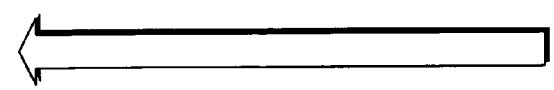
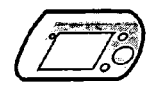
PRIOR ART
FIG. 2

```xml
<DEVCERT version="1.0">
  <CERTIFICATE type="DEVICE">
    <DATA>
      <UNIQUEID private="1" />
      <PUBLICKEY private="1" />
      <KEYDATA />
    </DATA>
    <MSDRM_SIGNATURE_VALUE />
    <SYMSIGNATURE />
  </CERTIFICATE>
  <FALLBACK>
    <SECURITYVERSION>2.3.0.2</SECURITYVERSION>
    <CERTIFICATE private="1" />
  </FALLBACK>
  <CERTIFICATE type="GROUP">
    <DATA>
      <NAME>CoolNewDevice</NAME>
      <MANUFACTURER>FooInc.</MANUFACTURER>
      <MAKE>UnknownMake</MAKE>
      <DISTRIBUTOR>BarRetailersInc.</DISTRIBUTOR>
      <MODEL>XR-700</MODEL>
      <SECURITYLEVEL>1000</SECURITYLEVEL>
      <HARDWARE_VER_MAJOR>2</HARDWARE_VER_MAJOR>
      <HARDWARE_VER_MINOR>1</HARDWARE_VER_MINOR>
      <FIRMWARE_VER_MAJOR>1</FIRMWARE_VER_MAJOR>
      <FIRMWARE_VER_MINOR>3</FIRMWARE_VER_MINOR>
      <FEATURES>
        <TEMPLATE>0</TEMPLATE>
        <CLOCK>2</CLOCK>
        <SECURECLOCK>
          <URL>http://go.microsoft.com/fwlink/?LinkId=25817</URL>
          <PUBLICKEY>!CNhvvz1WaNV1AFUmetxkvm9iD4UrE9cnGUi!qcqdxMiXmD1*ikYGA==</PUBLICKEY>
        </SECURECLOCK>
        <METERING>1</METERING>
        <LICENSE_ACQ>1</LICENSE_ACQ>
        <LICENSE_SYNC>1</LICENSE_SYNC>
        <ENCRYPTION>1</ENCRYPTION>
      </FEATURES>
      <LIMITS>
        <MAXCHAINDEPTH>2</MAXCHAINDEPTH>
        <MAXLICENSESIZE>10240</MAXLICENSESIZE>
        <MAXHEADERSIZE>5120</MAXHEADERSIZE>
      </LIMITS>
      <PUBLICKEY>JCOnd9zBbmuXUGLRejnachQZ1mvnWkcyuqzCMFXK19cE1K9WaqlKiQ==</PUBLICKEY>
    </DATA>
    <MSDRM_SIGNATURE_VALUE>Wur1VKP!TZIc5NJ0jqCMcxTZ2xC!BgcGPULAwlp4*jREYp04iPu2ZQ==</MSDRM_SIGNATURE_VALUE>
  </CERTIFICATE>
  <CERTIFICATE type="AUTHORIZATION">
    <DATA>
      <SECURITYLEVEL>1000</SECURITYLEVEL>
      <AUTH_ID>42</AUTH_ID>
      <PUBLICKEY>qR!YzDsKeOmtMbmZMoBKLtd34CG1foosdNebvjCu6!6SX3bGbZ2pVw==</PUBLICKEY>
    </DATA>
    <MSDRM_SIGNATURE_VALUE>CLKXqfYPZA5OJnVUR32*3CznkiRSILz5CX6Z5LQLHQDAFaqZ9j2HbQ==</MSDRM_SIGNATURE_VALUE>
  </CERTIFICATE>
  <CERTIFICATE type="AUTHORIZATION_ROOT">
    <DATA>
      <AUTH_ID>1</AUTH_ID>
      <PUBLICKEY>a1t3hxrg!qbOgktnbYaEEi4teCse!gz6RvTPuC!zizKJlpU7xoduSw==</PUBLICKEY>
    </DATA>
    <MSDRM_SIGNATURE_VALUE>yi5BF4OllZO!XeNtJdWql0ClJEH6iNPNS*qyjB1rJgTT!!d!Xq2UEg==</MSDRM_SIGNATURE_VALUE>
  </CERTIFICATE>
</DEVCERT>
```

FIG. 6

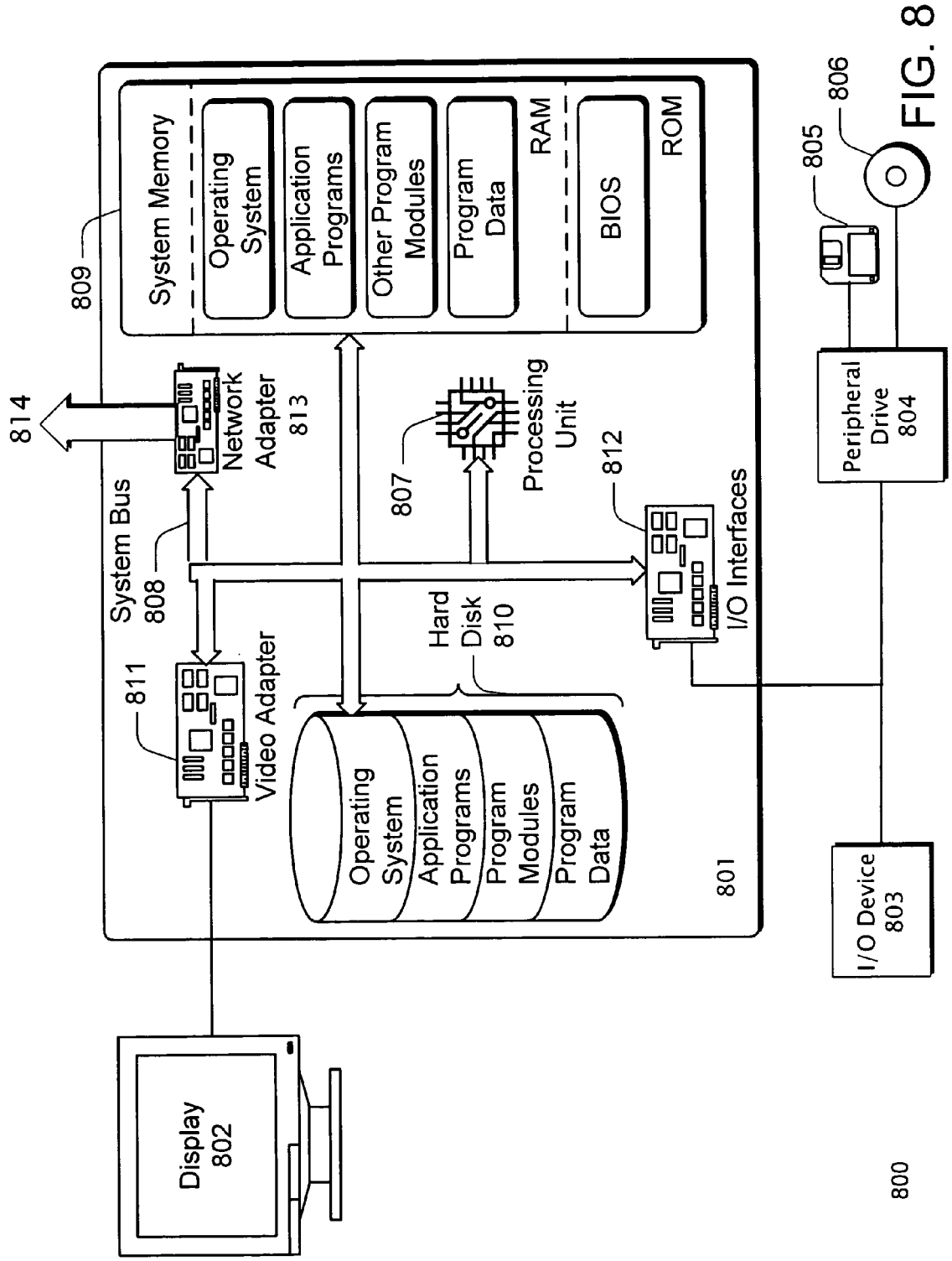

DEVICE CERTIFICATE SELF-INDIVIDUALIZATION

BACKGROUND OF THE INVENTION

This application relates generally to the manufacture of consumer electronic devices and more specifically to the creation of device certificates.

Electronics may be designed to play or process content that is regulated. Such content may be controlled or owned by a third party that allows access to the content on a limited basis. Examples are allowing information to be accessed a predetermined number of times, or for a given time period. A common way of controlling access is through licensing or metering. Control of access is typically provided at manufacture by security features that can prevent unauthorized access to the information.

SUMMARY OF THE INVENTION

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present invention provides a method of manufacturing consumer electronic devices that tends to reduce manufacturing cost and complexity. By building a consumer electronics devices with a template a unique device certificate can be generated at a later time. The device certificate is unique to the consumer electronics device and typically allows a person using the consumer electronics device to access protected content desired to be played on the device.

Security or encryption systems to protect against the unauthorized play of content or media files typically utilize a plurality of identifications, verifications, keys and the like to allow access to the content. Such security systems typically utilize a device certificate that contains a plurality of verifiers and the like, and is unique to the device seeking to play the content. By making it possible to delay the generation of a device certificate the manufacturing process tends so be simplified. The template contains information that tends to be common to all devices in a manufacturer's product line, and allows the device to self-generate a device certificate, utilizing a self individualization process, after the manufacturing process has been completed.

Many of the attendant features of this invention will be more readily appreciated as the same becomes better understood by reference to the following detailed description considered in connection with the accompanying drawings.

DESCRIPTION OF THE DRAWINGS

These and other features and advantages of the present invention will be better understood from the following detailed description read in light of the accompanying drawings, wherein:

FIG. 2 illustrates the conventional method of manufacturing consumer electronics devices with complete device certificates.

FIG. 6 is an exemplary XML device certificate template.

FIG. 8 illustrates an exemplary computing environment 800 in which the systems and methods described in this application, may be implemented.

Like reference numerals are used to designate like parts in the accompanying drawings.

DETAILED DESCRIPTION OF THE INVENTION

Figure 1:
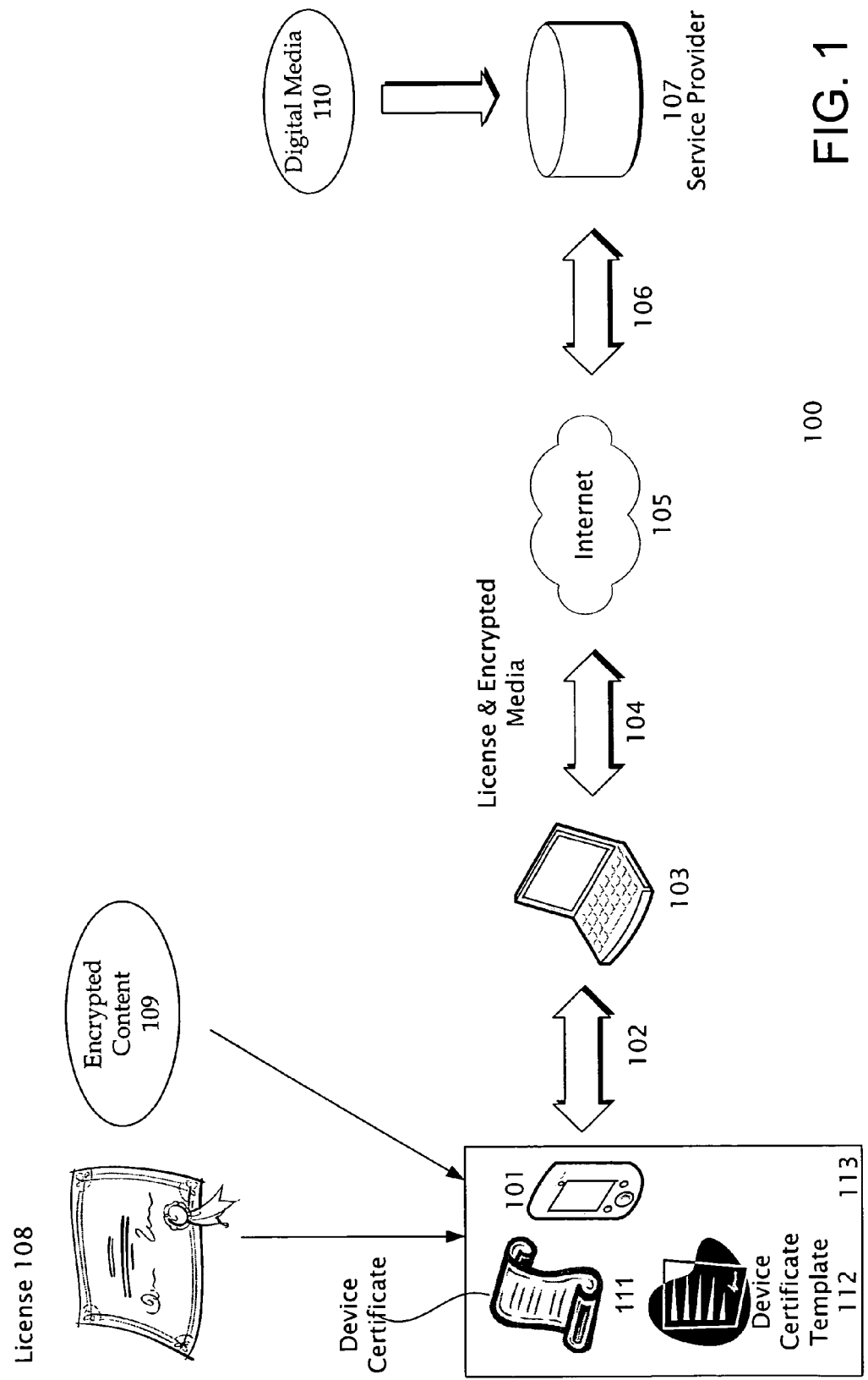
FIG. 1 is a diagram of a digital rights management system.

The detailed description provided below in connection with the appended drawings is intended as a description of the present examples of the invention and is not intended to represent the only forms in which the present invention may be constructed or utilized. The description sets forth the functions of the invention and the sequence of steps for constructing and operating the invention in connection with the examples illustrated. However, the same or equivalent functions and sequences may be accomplished by different examples of the invention.

Although the present invention is described and illustrated herein as being implemented in a consumer electronics ("CE") system, the system described is provided as an example and not a limitation. CE devices may include pocket PCs, set top boxes, portable media centers, cell phones, music players, PCs, software constructed media players, and the like. As those skilled in the art will appreciate, the present invention is suitable for application in a variety of different types of systems that utilize licenses to regulate the playback of content. A typical system is a digital rights management ("DRM") system. The use of a device certificate template may be useful in the individualization process typically used in these types of systems.

Most current DRM solutions rely on unique identification of user devices. Each license is typically bound to a unique playback device (or consumer electronics device), so the license stored in one device cannot be transferred or used by another device. To illustrate how this works, we use the example of a typical individualization process.

An individualized media player is one whose DRM component has been individualized, which is like receiving a security upgrade. Content providers may require their digital content to be played only on the player that has been individualized. During individualization process, the certificate authority's individualization service generates a unique dynamic link library ("DLL") that is bound to the client computer using its hardware ID. Once the player has been individualized, a public/private key pair is generated. The private key is stored in the DLL file that is generated in the individualization process. The corresponding public key is used as the player's identifier when requesting a license and a clearinghouse will encrypt the license using this key. If the player is moved to another host, it may require another individualization, because there is no corresponding DLL file binding to the new host. The license granted by the clearinghouse is not transferable or usable on another computer.

In the context of DRM, individualization can reduce the damage caused by system cracking, because if the DRM module on a user's computer is compromised, only that terminal is affected. However, it introduces another problem concerning the portability of rights: When the user wants to watch the movie at his friend's place or listen to the music on his portable devices (PDAs, mobile phones, portable players, etc.), he has to acquire new licenses for every device to enable content consumption. To reduce the impact of digital licensing process on the user experience, some DRM solutions allow users to back up their licenses and restore to another computer. To prevent abuse, users can typically only do this a fixed number of times.

FIG. 1 is a diagram of a digital rights management system 100. Digital rights management (DRM) provides a system for defining, incorporating, and enforcing rights to digital media 110. A DRM system 100 provides secure distribution of multimedia content 110 from a service provider 107 over insecure channels such as the Internet 105. The system 100 can enforce usage rules and protect the multimedia content 110 from being used illegally. Usage rules can include expiration dates, the number of times a user can play an audio or video file, and the number of times a user can copy an audio or video file and the like. An example of a Digital Rights Management system is provided in U.S. patent application Ser. No. 09/290,363, filed Apr. 12, 1999, U.S. patent applications Ser. Nos. 10/185, 527, 10/185,278, and 10/185,511, each filed on Jun. 28, 2002 which are hereby incorporated by reference in its entirety.

A personal computer 103 may be used to connect to the internet 105 and transfer content from the service provider 107 to a consumer electronics device 101. Protocols for transferring information to the PC 103, and to the CE device 101 over paths 102 and 104 may be achieved by conventional connections such as USB, infrared, Blue Tooth, MTP and the like. In alternative embodiments a consumer electronics device may be coupled to a service provider without using the personal computer 103. The personal computer and the CE devices may operate utilizing any number of suitable operating systems known to those skilled in the art. The instructions for implementing the functions described in this application may exist as software, hardware (for example instructions burned into an ASIC), or a combination of both.

In typical use, DRM 100 protects contents 110 by providing encrypted data files 109. Since files 109 are encrypted, the data itself is protected. Thus, the files 109 may be moved, archived, copied, or distributed without restriction. There is no need to hide files or make them inaccessible, or to put special protection in place when files are transmitted from system to system. However, copying a file and giving it to a friend will not enable that friend to use the file. In order to be able to use an encrypted file, users must obtain a license 108. This license 108 is a way of exercising control over the encrypted file 110. A license 108 is typically granted to a single machine 101, and even if copied, it will not tend to function on other machines.

Each license 108 contains rights and restrictions, defining how the data in a file may be used, and under what conditions. For example, a music file license may contain a "right to play" but not a "right to burn to CD", and it might enable these rights for the period between Oct. 1, 2005 and Nov. 1, 2005. It is also possible that there will be multiple licenses for a file. As long as one of those licenses grants the needed right, the user will be able to access and use their data. Access may refer to cryptographically decrypting a file, gaining access to a file by password, and the like so that the consumer electronics device can use, view, play and otherwise use the content of the file.

In the embodiments of the invention described the license 108 works in conjunction with a device certificate 111 that allows the encrypted content 109 to be played on a consumer electronics device 101. The file can also be viewed if the CE device provides video, or picture capabilities. Files for viewing or playback would typically include music files, picture files, video files, documents, and the like. In short anything that a service provider wishes to transmit securely over an unsecured channel. The system identifies itself through a device certificate. This exemplary XML structure, or its equivalent, describes the CE device, lists supported features, and also contains the system's public key. The device certificate 111 is unique to an individual consumer electronics device. In the embodiments the unique device certificate 111 is generated from a device certificate template 112 that is packaged 113 with the consumer electronics device 101. The device certificate template may be considered a special pattern, guide or the like that aids in the creation of the device certificate.

Consumer electronic devices 101 that regulate playback may be referred to as digital rights management ("DRM") devices. Such devices may be part of a DRM system 100 that controls the distribution of protected content 109 and access to that content 110. DRM-enabled devices 101 may contain an XML (or the equivalent of XML) object called a "Device Certificate" ("Dev Cert") 111 which is used to help ensure the security of DRM operations. Typically a device certificate can be provided in any format or data structure, besides XML. The device certificate 111 is unique to each CE device 101 and is typically harder for a manufacturer to provide in the CE device 101 than a simple serial number.

Device certificates 111 are security devices that may be used in consumer electronics devices 101 to provide security by authenticating that a device 101 is allowed to access protected content 109. Device certificates are the credentials that are trusted and relied upon by an outside entity that may cause the entity provide content to the CE device. Such automated device authentication may be used in systems 100 designed for secure playback or use of protected media content and where digitally signed certificates 111, or the like, are used as the way of providing authentication of rights to access media content. Protected media content 109 may include music, video, text, or any content that is subject to management by conventional license agreements or the like.

The exemplary device certificate 111 may be an XML object that gathers together device identification, device capabilities claims, vital info, public key info, and the like and present the information in a single digitally signed device certificate. A device certificate typically utilizes as a minimum the public key and a signature, other information included in the device certificate is optional. The device certificate 111 may be signed by an OEM signing certificate (not shown), which may be a certification by the OEM that the device certificate 111 is an accurate reflection of the device 101 accompanying it, and by a third party content regulator certificate (not shown) which certifies that the OEM is authorized to create and certify DRM systems.

The embodiments of the invention tend to solve manufacturing problems associated with generating unique and verifiable device certificates 111 for each consumer electronics device 101 in an OEMs product line. The embodiments tend to allow the manufacturer to ship an entire product line using a device certificate template 112 which is typically identical for all devices in the product line. Using the template 112, a device 101 may automatically and securely self-individualize after manufacturing. In other words, the device creates a unique device certificate 111 based on the templates 112 built into the device. The device 101 may then access the encrypted content 109, when the proper license 108 is present.

The device certificate template 112 may have the sections of a typical device certificate, but device specific sections are empty. The template 112 is signed by the OEM or manufacturer and includes the third party content provider's own device authorization certificate. To create the device certificate 111 from the device certificate template 112 a process of device certificate individualization is initiated. Once the device certificate has been created, protected content may be loaded onto the CE device.

FIG. 2 illustrates the conventional method of manufacturing consumer electronics devices 101, 102, 103 with complete device certificates 104, 105, 106. A manufacture will typically produce a product line of consumer electronic devices 201, 202, 203 shown. Each consumer electronics device 201, 202, 203 is built with a corresponding unique device certificate 204, 205, 206. Each device certificate is unique to the consumer electronics device that was shipped with it. Providing a device certificate is typically an additional step that is needed in the manufacture of consumer electronics devices that tends to increase the cost and complexity of consumer electronics devices.

Figure 3:
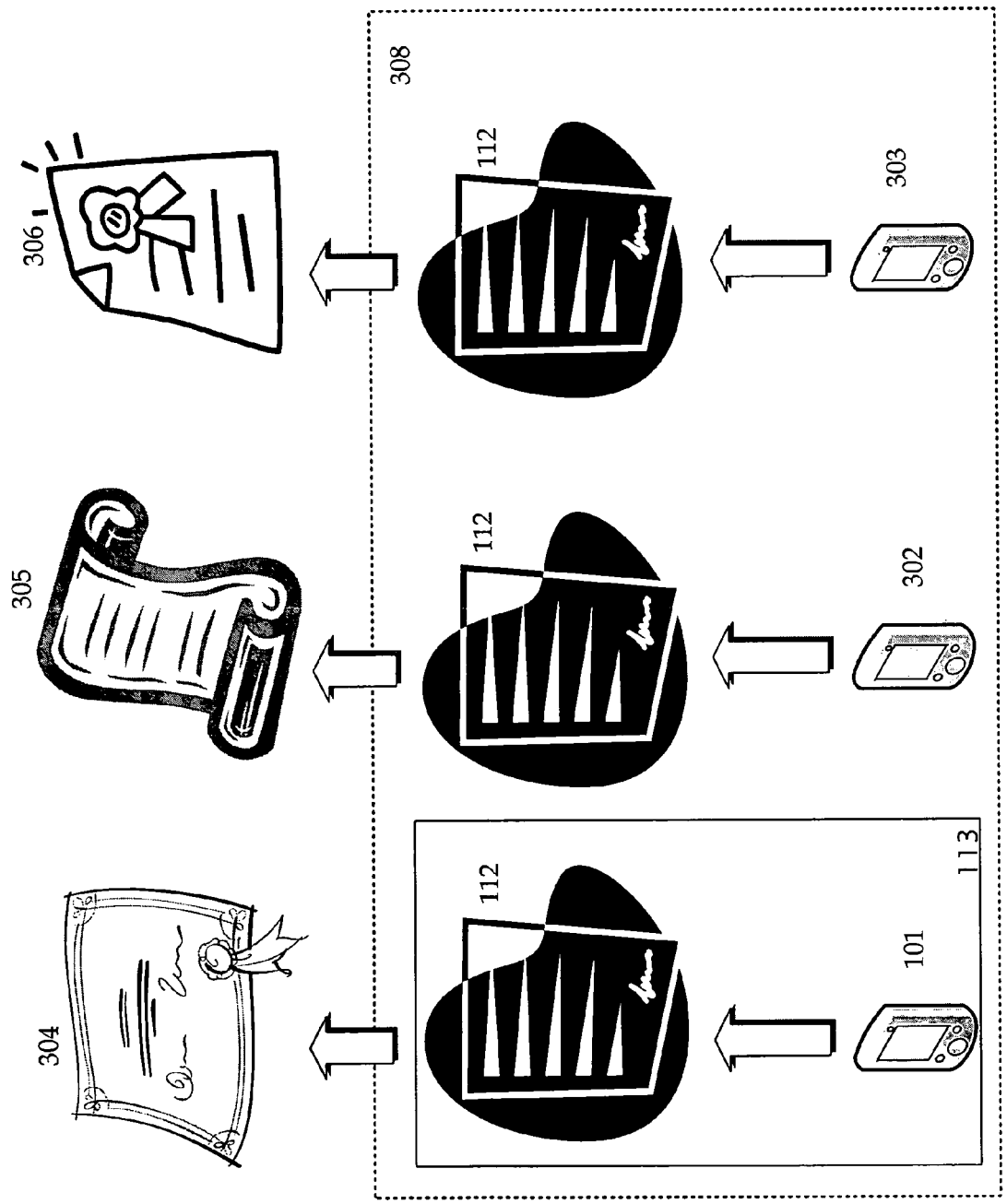
FIG. 3 illustrates a method of manufacturing consumer electronics devices with device templates that will enable the generation of complete device certificates at a later time.

FIG. 3 illustrates a method of manufacturing consumer electronics devices 101, 302, 303 with common device templates 112 that will enable the later generation of complete device certificates 304, 305, 306 at a later time. In the example shown any number of consumer electronics devices may be built in a production run or lot of devices produced, with typically the same device certificate template 112. Loading each device with the same template may aid the manufacturing process by allowing the device certificate to be created at a later time by filling in the template so that the device certificate is generated from the template. As an example an entire production run of devices having ROMs may be built using the same ROM image on each device. There tends not to be individualized programming for each device built because of the use of a device certificate template.

Figure 4:
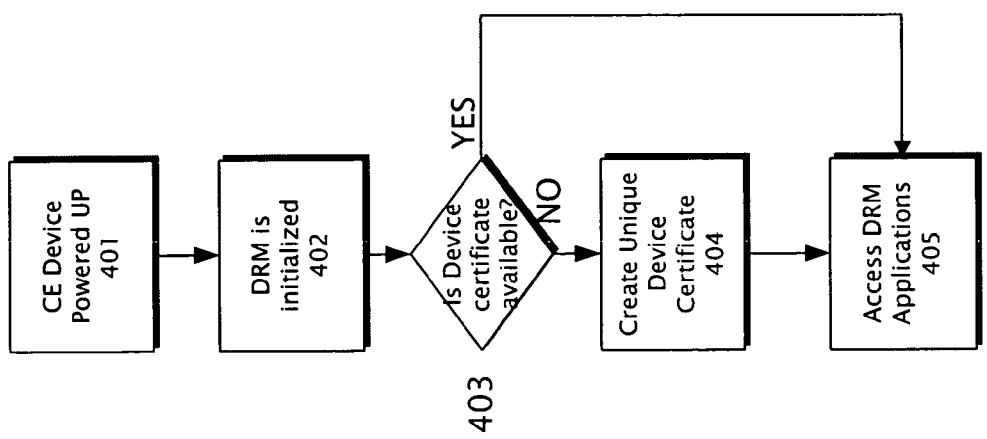
FIG. 4 is a block diagram of the device certificate individualization or initialization process that transforms the device certificate template into a unique device certificate.

FIG. 4 is a block diagram of the device certificate individualization or initialization process that transforms the device certificate template into a unique device certificate. Device certificate individualization may occur after the CE device has been shipped, and typically creates the device certificate before DRM content is accessed. Non-DRM content typically will not initiate the self individualization process, since a device certificate is typically not needed to access non-DRM content. If the CE device is compromised, device certificate individualization may be repeated after wiping out old device certificate. However the device may also need to get an updated template from the manufacturer, because the device certificate is based on template. If the device certificate is revoked, a new device certificate from the old template will also be revoked.

At block 401 the CE device is powered up. Power up or in alternative embodiments an attempt to access DRM protected content may initiate the individualization process. At block 402 DRM is initialized. At block 403 if the device certificate is available the process skips to block 405. If the device certificate is not available at block 403 the process continues to block 404.

At block 404 a unique device certificate is created. And finally at block 405 the DRM content is accessed.

Figure 5:
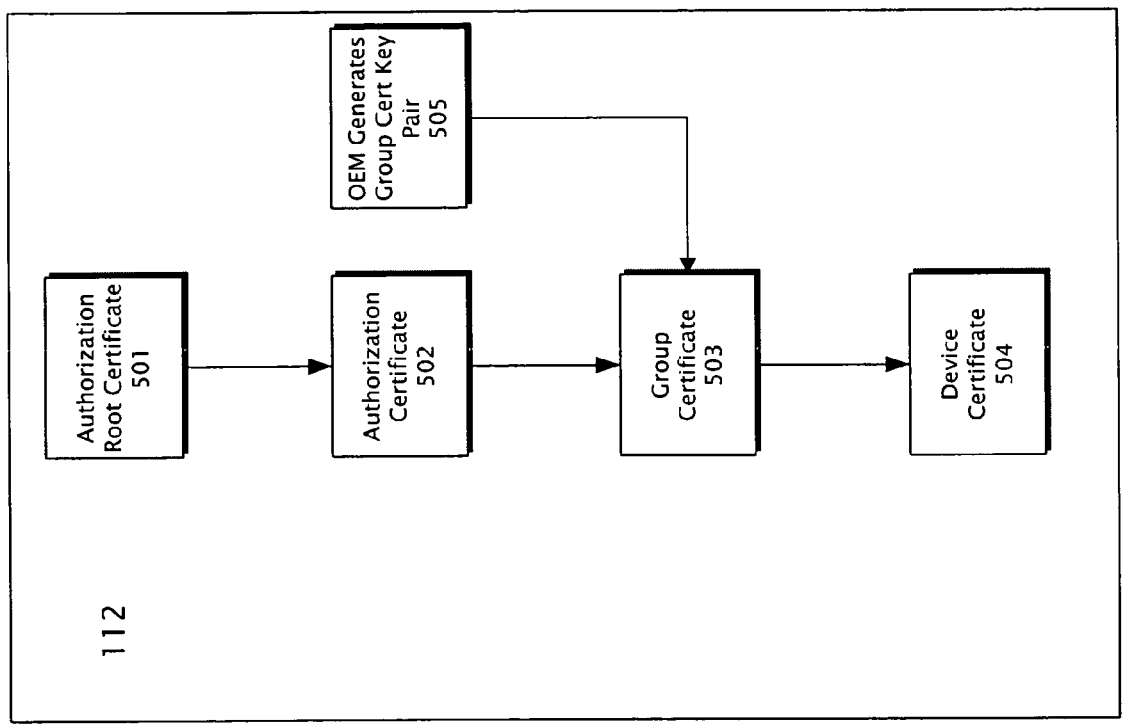
FIG. 5 illustrates the sections that make up an exemplary device certificate template.

FIG. 5 illustrates the sections that make up the device certificate template 112. A template as described would typically be stored in a memory of the consumer electronic device. Equivalently the template may be stored on other types of memories such as ASICS, one or more floppy disks, optical disks, hard disks and the like. The sections of the device certificate template work together to establish a route of trust so that the content provider has a reasonable expectation that the data being transmitted over the insecure channels will reach an authorized user. For backwards compatibility, or other purposes more than one route of trust may be provided in the device certificate template.

In establishing a route of trust, that is reflected in the device certificate template, an OEM typically generates a public and private key pair. This device authorization certificate ("DAC") generated by the OEM includes a private key that is stored in a secure location by the OEM. Also included is a public key that is typically sent to a certificate authority. The certificate authority verifies the OEM's DAC and returns the Authorization Root certificate and Authorization Certificate which are sent back to the OEM.

The OEM is equipped with a software tool from the certificate authority to generate a Group Certificate. The group certificate may include features of the device, limits, meta data (manufacturer name, model number and the like). The OEM then signs this Group Certificate with the DAC private key. Putting the AUTHORIZATION_ROOT Certificate 501, AUTHORIZATION Certificate 502 and the Group Certificate on the unsigned template allows the template to be generated and put onto the device plus the group certification private key. After manufacture, a trigger, such as powering the device up, or attempting to access a file, will cause the Device Certificate to be generated by filling out any needed information called for in the template and signing with the group certification private key. The trigger may be thought of as an initiating event, or a start command that starts the self individualization process or device certificate generation.

In establishing the route of trust each of the individual certificates in the device certificate establishes a route of trust that can be traced back to the OEM. If need be individual certificates can be revoked, breaking the chain.

The AUTHORIZATION_ROOT Certificate 501 is a section contained in the device certificate template. This section contains the certificate authority's root certificate information. The certificate authority's root certificate is typically the highest level of authorization, and is issued by the certificate authority. Other certificates that make up the chain of trust to allow content access may be based upon the authorization root certificate. In general, the root certificate contains an ID (Identifying whom are you certifying) and a public key which is being certified. This certificate is signed by certificate authority's private key. The private key is typically stored in a secure vault controlled by the certificate authority. A corresponding public key is hard coded in the security system's code of the CE device to verify the signature.

AUTHORIZATION Certificate: This section contains Authorization to an OEM by the certificate authority to produce Device certificates. The data section contains an Authorization ID of OEM, Max security level of the device, and a Public key to sign Group certificate. This data section is signed using the certificate authority's private key. The corresponding Public key is in the Authorization Root Certificate.

GROUP Certificate: This Data section contains device features which are identical for entire product line such as name of device, manufacturer etc. It contains a GROUP Certificate Public key which is in turn a basis of verifying the DEVICE certificate section. The corresponding private key is hidden on the device. The device certificate section is signed using this private key.

FIG. 6 is an exemplary XML device certificate template. The device certificate template may be written in XML or its equivalent. An example of XML code implementing the authorization root certificate 501 is as shown. The authorization root certificate includes calling the public key. Also included in the device certificate template is the XML code that makes up the authorization certificate 502. And above that, the XML code that makes up the group certificate 503 is shown. Lastly the section of the XML encoded template that will be filled in to create the device certificate 504 is shown at the top of the page. Provisions for backwards compatibility or legacy licensing 601 are included in the XML code.

The various sections that make up the device certificate template may appear in any order in the template, with the shown order being but one example. Also the device certificate template may be coded in a variety of languages such as html, binary format and the like. In alternative embodiments it is also possible to load the template from a server, rather than having the manufacturer preload the template on the CE device.

Figure 7:
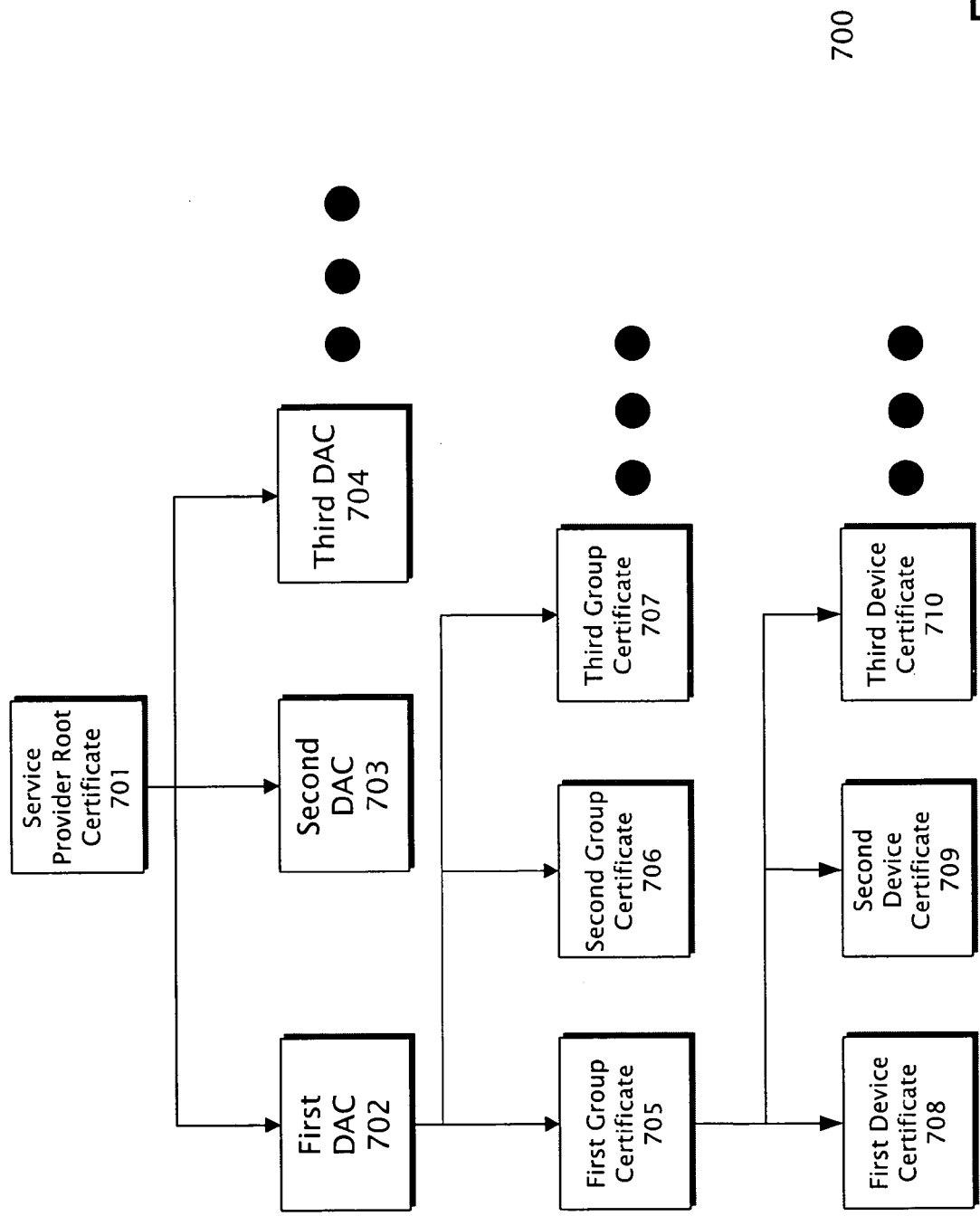
FIG. 7 is an illustration of a route of trust structure in an exemplary device certificate template.

FIG. 7 is an illustration of a chain of trust structure 700 present in an embodiment of a device certificate template. In the chain of trust structure an authorization root certificate 701 generates numerous Authorization certificates or DACs 702, 703, 704 for individual OEMs. The DACS also may include a security level. Each horizontal level may be thought of as a link in the chain of trust as a path is traversed from top to bottom. Each link typically has a certificate associated with it to establish the validity of the link, and couple it to the previous and following link. For example blocks 701, 702, 705, and 708 may be thought of as links going from the authorization root link 701 to the device certificate 708. A device certificate template is typically formed by incorporating each link in the chain of trust in a section of fields that form the template.

From each DAC given to an OEM, that OEM can generate multiple group certificates 705, 706, 707 for each model of device produced by the OEM. Device certificates 708, 709, 710 are generated each device built and are based upon the group certificates. It is possible to change the levels of security by adding or removing levels of group certificates. For example a level of device certificates can be added to differentiate production runs of a particular model of consumer electronics device.

Alternatively the initialization of a device could be performed at manufacture off of the consumer electronic device, and then imaged onto the consumer electronic device. The initialization could be performed on a manufacturer's PC, and imaged onto the CE device.

FIG. 8 illustrates an exemplary computing environment 800 in which the systems and methods described in this application, may be implemented. Exemplary computing environment 800 is only one example of a computing system and is not intended to limit the examples described in this application to this particular computing environment.

The computing environment 800 can be implemented with numerous other general purpose or special purpose computing system configurations. Examples of well known computing systems, may include, but are not limited to, personal computers, hand-held or laptop devices, microprocessor-based systems, multiprocessor systems, set top boxes, programmable consumer electronics, gaming consoles, Consumer electronics, cellular telephones, PDAs, and the like.

The computer 800 includes a general-purpose computing system in the form of a computing device 801. The components of computing device 801 can include one or more processors (including CPUs, GPUs, microprocessors and the like) 807, a system memory 809, and a system bus 808 that couples the various system components. Processor 807 processes various computer executable instructions to control the operation of computing device 801 and to communicate with other electronic and computing devices (not shown). The system bus 808 represents any number of several types of bus structures, including a memory bus or memory controller, a peripheral bus, an accelerated graphics port, and a processor or local bus using any of a variety of bus architectures.

The system memory 809 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 807.

Mass storage devices 804 may be coupled to the computing device 801 or incorporated into the computing device by coupling to the buss. Such mass storage devices 804 may include a magnetic disk drive which reads from and writes to a removable, non volatile magnetic disk (e.g., a "floppy disk") 805, or an optical disk drive that reads from and/or writes to a removable, non-volatile optical disk such as a CD ROM or the like 806. Computer readable media 805, 806 typically embody computer readable instructions, data structures, program modules and the like supplied on floppy disks, CDs, portable memory sticks and the like.

Any number of program modules can be stored on the hard disk 810, Mass storage device 804, ROM and/or RAM 8-9, including by way of example, an operating system, one or more application programs, other program modules, and program data. Each of such operating system, application programs, other program modules and program data (or some combination thereof) may include an embodiment of the systems and methods described herein.

A display device 802 can be connected to the system bus 808 via an interface, such as a video adapter 811. A user can interface with computing device 702 via any number of different input devices 803 such as a keyboard, pointing device, joystick, game pad, serial port, and/or the like. These and other input devices are connected to the processors 807 via input/output interfaces 812 that are coupled to the system bus 808, but may be connected by other interface and bus structures, such as a parallel port, game port, and/or a universal serial bus (USB).

Computing device 800 can operate in a networked environment using connections to one or more remote computers through one or more local area networks (LANs), wide area networks (WANs) and the like. The computing device 801 is connected to a network 814 via a network adapter 813 or alternatively by a modem, DSL, ISDN interface or the like.

Those skilled in the art will realize that storage devices utilized to store program instructions can be distributed across a network. For example a remote computer may store a tool such as the adaptive instrumentation runtime monitoring and analysis software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method of generating a unique device certificate for a device among a plurality of devices in a product line, wherein the unique device certificate is used for accessing protected content, the method comprising:

during manufacture of the device, forming a template for the device that is identical to corresponding templates manufactured for one or more of the plurality of devices in the product line, wherein device specific sections of the template are initially empty, wherein the forming comprises:
  filling in an authorization root certificate section of the template;
  filling in an authorization certificate section of the template;
  filling in a group certificate section of the template; and
  after manufacture of the device, the device self-generating the unique device certificate by individualizing the template for the device upon the occurrence of a triggering event, wherein the triggering event comprises at least one of powering up the device and attempting to access the protected content.

2. The method of generating a device certificate of claim 1, in which the template is written in extensible mark up language.

3. The method of generating a device certificate of claim 1, in which the template is written in binary format.

4. The method of generating a device certificate of claim 1, in which the template is written in hyper text mark up language.

5. The method of generating a device certificate of claim 1, in which the authorization root certificate section is signed by a certificate authority's private key.

6. The method of generating a device certificate of claim 1, in which the authorization root certificate section includes a public key enclosed within a consumer electronics device including the device certificate.

7. A consumer electronics device among a plurality of consumer electronics devices in a product line, the consumer electronics device comprising:
  a license disposed on the consumer electronics device;
  an encrypted file disposed on the consumer electronics device;
  a device certificate template disposed on the consumer electronics device, wherein the device certificate template at the time of manufacture of the consumer electronics device is identical to corresponding device certificate templates manufactured for one or more of the plurality of consumer electronics devices in the product line, wherein device specific sections of the template are initially empty, wherein the device certificate template comprises an authorization root certificate section, an authorization certificate section, and a group certificate section; and
  a device certificate unique to the consumer electronics device that is self-generated by the device by individualizing the device certificate template disposed on the consumer electronics device upon the occurrence of a triggering event, wherein the triggering event comprises at least one of powering up the consumer electronics device and attempting to access the encrypted file.

8. The consumer electronics device of claim 7, in which the device certificate and license allows the encrypted file to be accessed by the consumer electronics device.

9. The consumer electronics device of claim 8, in which the encrypted file is a music file that is played after access by the consumer electronics device.

10. The consumer electronics device of claim 8, in which the encrypted file is a picture file that is viewed after access by the consumer electronics device.

11. The consumer electronics device of claim 8, in which the encrypted file is a mixed media file that is played, and viewed after access by the consumer electronics device.

12. The consumer electronics device of claim 8, in which the encrypted file is a video file that is viewed after access by the consumer electronics device.

13. The consumer electronics device of claim 8 in which the consumer electronics device is a music player.

14. The consumer electronics device of claim 8 in which the consumer electronics device is a cellular telephone.

15. The consumer electronics device of claim 8 in which the device certificate, the encrypted file, and the license operate under a DRM system to cause playback of the encrypted file.

16. A consumer electronics device among a plurality of consumer electronics devices in a product line produced by the process comprising:
  during manufacture of the consumer electronics device, forming a template for the consumer electronics device that is identical to corresponding templates manufactured for one or more of the plurality of consumer electronics devices in the product line, wherein device specific sections of the template are initially empty, wherein the forming comprises:
    loading an authorization root certificate onto a memory of the consumer electronics device at manufacture;
    loading an authorization certificate onto a memory of the consumer electronics device at manufacture;
    loading a group certificate onto a memory of the consumer electronics device at manufacture; and
  pre loading information to cause the creation of a device certificate unique to the consumer electronics device from the authorization root certificate, the authorization certificate, and the group certificate after manufacture of the consumer electronics device, wherein the unique device certificate is self-generated by the device by individualizing the template for the consumer electronics device upon the occurrence of a triggering event, wherein the triggering event comprises at least one of powering up the consumer electronics device and attempting to access protected content.

* * * * *